(12) United States Patent
Kim

(10) Patent No.: US 7,733,450 B2
(45) Date of Patent: Jun. 8, 2010

(54) LIQUID CRYSTAL DISPLAY DEVICE WITH SPECIFIC COMPENSATION FILM

(75) Inventor: Ghang Kim, Suwon-si (KR)

(73) Assignee: Samsung Mobile Display Co., Ltd., Gyeonggi-do (KR)

( * ) Notice: Subject to any disclaimer, the term of this patent is extended or adjusted under 35 U.S.C. 154(b) by 304 days.

(21) Appl. No.: 12/010,608

(22) Filed: Jan. 28, 2008

(65) Prior Publication Data

US 2008/0180605 A1 Jul. 31, 2008

(30) Foreign Application Priority Data

Jan. 29, 2007 (KR) .................. 10-2007-0009010

(51) Int. Cl.
*G02F 1/1335* (2006.01)
(52) U.S. Cl. ............... 349/117; 349/119; 349/96; 349/99
(58) Field of Classification Search .......... 349/117, 349/119, 96, 99
See application file for complete search history.

(56) References Cited

U.S. PATENT DOCUMENTS

| | | | |
|---|---|---|---|
| 6,493,053 B1 | 12/2002 | Miyachi et al. | |
| 7,133,096 B2 | 11/2006 | Kabe et al. | |
| 7,307,679 B2 * | 12/2007 | Toyooka et al. | 349/99 |
| 2001/0038369 A1 | 11/2001 | Adachi et al. | |
| 2007/0236631 A1 * | 10/2007 | Ohtani et al. | 349/96 |
| 2008/0158488 A1 * | 7/2008 | Yanai et al. | 349/107 |

FOREIGN PATENT DOCUMENTS

| | | |
|---|---|---|
| JP | 2001-142072 | 5/2001 |
| JP | 2004-264578 | 9/2004 |
| KR | 10-2001-0021234 A | 3/2001 |
| KR | 10-2005-0061643 A | 6/2005 |
| KR | 10-2006-0080574 A | 7/2006 |

* cited by examiner

*Primary Examiner*—Mike Qi
(74) *Attorney, Agent, or Firm*—Lee & Morse P.C.

(57) ABSTRACT

A liquid crystal display (LCD) device includes first and second substrates, an electrically controlled birefringence (ECB) mode liquid crystal layer between the first and second substrates, a first polarizer under the first substrate, a second polarizer on the second substrate, and a first compensation film between the first and second polarizers, wherein an optical transmission axis of the first compensation film is set at a 90° angle with respect to an alignment direction of the ECB liquid crystal layer.

15 Claims, 5 Drawing Sheets

LIQUID CRYSTAL DISPLAY DEVICE WITH SPECIFIC COMPENSATION FILM

BACKGROUND OF THE INVENTION

1. Field of the Invention

Embodiments of the present invention relate to a liquid crystal display device. More particularly, embodiments of the present invention relate to an electrically controlled birefringence liquid crystal display device operating at a normally black mode and having an enhanced contrast ratio.

2. Description of the Related Art

Liquid crystal display (LCD) devices refer to flat displays employing electro-optical properties of liquid crystal to display images. Conventional LCD devices may include absorptive, scattering, reflective, and polarization modulation-type LCD devices.

A conventional polarization modulation-type LCD device may be characterized as a twisted nematic (TN) LCD, i.e., a display device employing nematic type liquid crystal molecules between two substrates, and/or an electrically controlled birefringence (ECB) LCD, i.e., a display configured to convert optical retardation in order to control light transmittance. Application of voltage to the polarization modulation-type LCD may affect polarization of light passing through the liquid crystal layer, e.g., through the TN liquid crystal molecules, thereby controlling light transmittance in the LCD to form images. The images may be formed either in a normally white mode or in a normally black mode.

The normally white mode refers to a bright display, i.e., maximized light transmittance, under a low voltage application and to a dark display under a high voltage application. The normally black mode refers to a dark display, i.e., minimized light transmittance, under a low voltage application, e.g., a non-operational state, and to a bright display under a high voltage application. Even though the normally black mode may exhibit a relatively lower light transmittance as compared to the normally white mode, the normally black mode may be characterized with a low power consumption when many dark grey levels are displayed. Further, the normally black mode may exhibit a higher power efficiency than the normally white mode due to its ability to employ a standby power to display images when a power source is turned off. Accordingly, it may be advantageous to employ a polarization modulation-type LCD device operating at a normally black mode.

However, a manufacturing process of an LCD device operating at a normally black mode may be complex. In particular, the normally black mode may be realized by either a vertical alignment (VA) method, i.e., vertically aligning liquid crystal molecules with respect to the substrates at a low voltage state, or by an in-plane switching (IPS) method, i.e., horizontally aligning liquid crystal molecules with respect to the substrates, so that a light absorption axis of a polarizer may be perpendicular to an alignment direction of the liquid crystal molecules. As such, realizing a normally black mode may be difficult in LCD devices due to light dispersion through the liquid crystal molecules. Further, the light dispersion may decrease the contrast ratio of the LCD device. Accordingly, conventional LCD devices operating at a normally black mode may require a complex manufacturing process with high manufacturing costs.

SUMMARY OF THE INVENTION

Embodiments of the present invention are therefore directed to a liquid crystal display (LCD) device, which substantially overcomes one or more of the disadvantages of the related art.

It is therefore a feature of an embodiment of the present invention to provide an electrically controlled birefringence (ECB) LCD device operating at a normally black mode and having a high contrast ratio.

It is another feature of an embodiment of the present invention to provide an ECB LCD device operating at a normally black mode and having a simplified manufacturing process at reduced costs.

At least one of the above and other features and advantages of the present invention may be realized by providing a LCD device, including first and second substrates, an electrically controlled birefringence (ECB) mode liquid crystal layer between the first and second substrates, a first polarizer under the first substrate, a second polarizer on the second substrate, and a first compensation film between the first and second polarizers, wherein an optical transmission axis of the first compensation film is set at a 90° angle with respect to an alignment direction of the ECB liquid crystal layer.

The first and second polarizers may be configured to have perpendicular light absorption axes. The ECB mode liquid crystal layer may have an alignment direction of about 45°. A retardation of the first compensation film may substantially equal a retardation of the ECB liquid crystal layer. The retardation of the first compensation film may be about $\lambda/2$. The first compensation film may be between the ECB liquid crystal layer and the second polarizer. The first compensation film may include a half wave plate. The LCD device may be configured to operate in a normally black mode.

The LCD device may further include a second compensation film between the first and second polarizers, the second compensation film having an optical transmission axis set at a 90° angle with respect to the alignment direction of the ECB liquid crystal layer. The ECB liquid crystal layer may be between the first and second compensation films. The first compensation film may be between the ECB liquid crystal layer and the first polarizer. The second compensation film may be between the ECB liquid crystal layer and the second polarizer. The first and second compensation films may have substantially same optical retardation values. Each of the first and second compensation films may include a quarter wave plate. A sum of optical retardation values of the first and second compensation films may substantially equal an optical retardation value of the liquid crystal layer.

BRIEF DESCRIPTION OF THE DRAWINGS

The above and other features and advantages of the invention will become more apparent to those of ordinary skill in the art by describing in detail exemplary embodiments thereof with reference to the attached drawings, in which.

DETAILED DESCRIPTION OF THE INVENTION

Figure 1:
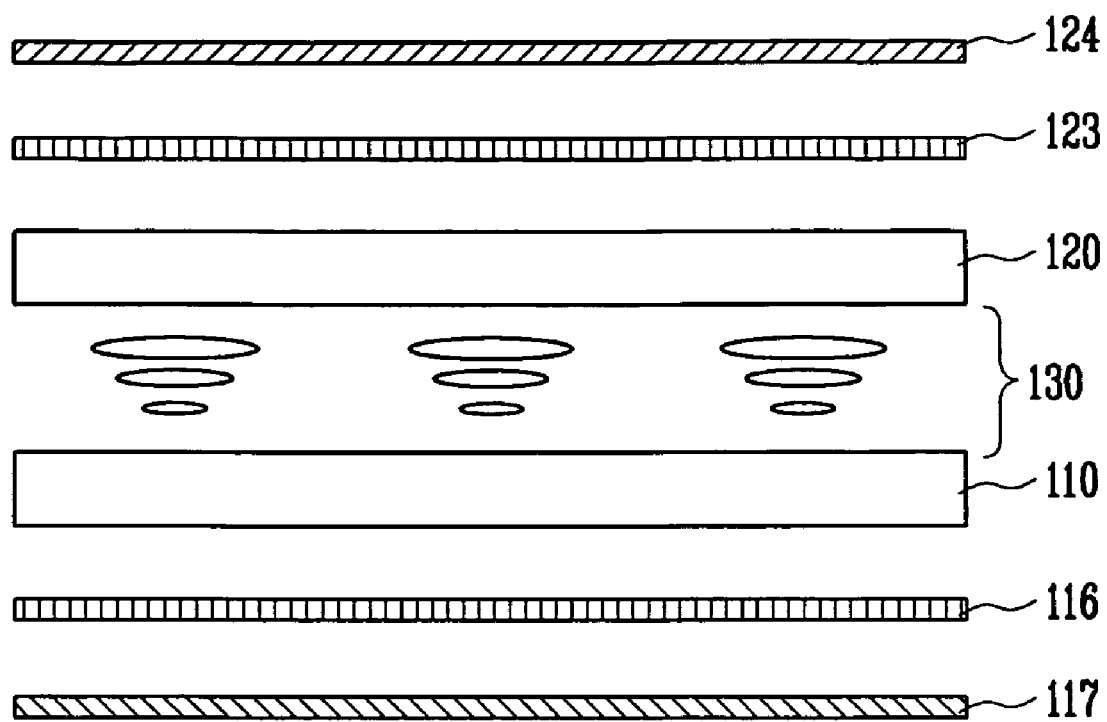
FIG. 1 illustrates a schematic cross-sectional view of a liquid crystal display (LCD) device according to an embodiment of the present invention.

Korean Patent Application No. 10-2007-0009010, filed on Jan. 29, 2007, in the Korean Intellectual Property Office, and entitled: "Liquid Crystal Display Device," is incorporated by reference herein in its entirety.

Embodiments of the present invention will now be described more fully hereinafter with reference to the accompanying drawings, in which exemplary embodiments of the invention are illustrated. Aspects of the invention may, however, be embodied in different forms and should not be construed as limited to the embodiments set forth herein. Rather, these embodiments are provided so that this disclosure will be thorough and complete, and will fully convey the scope of the invention to those skilled in the art.

In the figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 2:
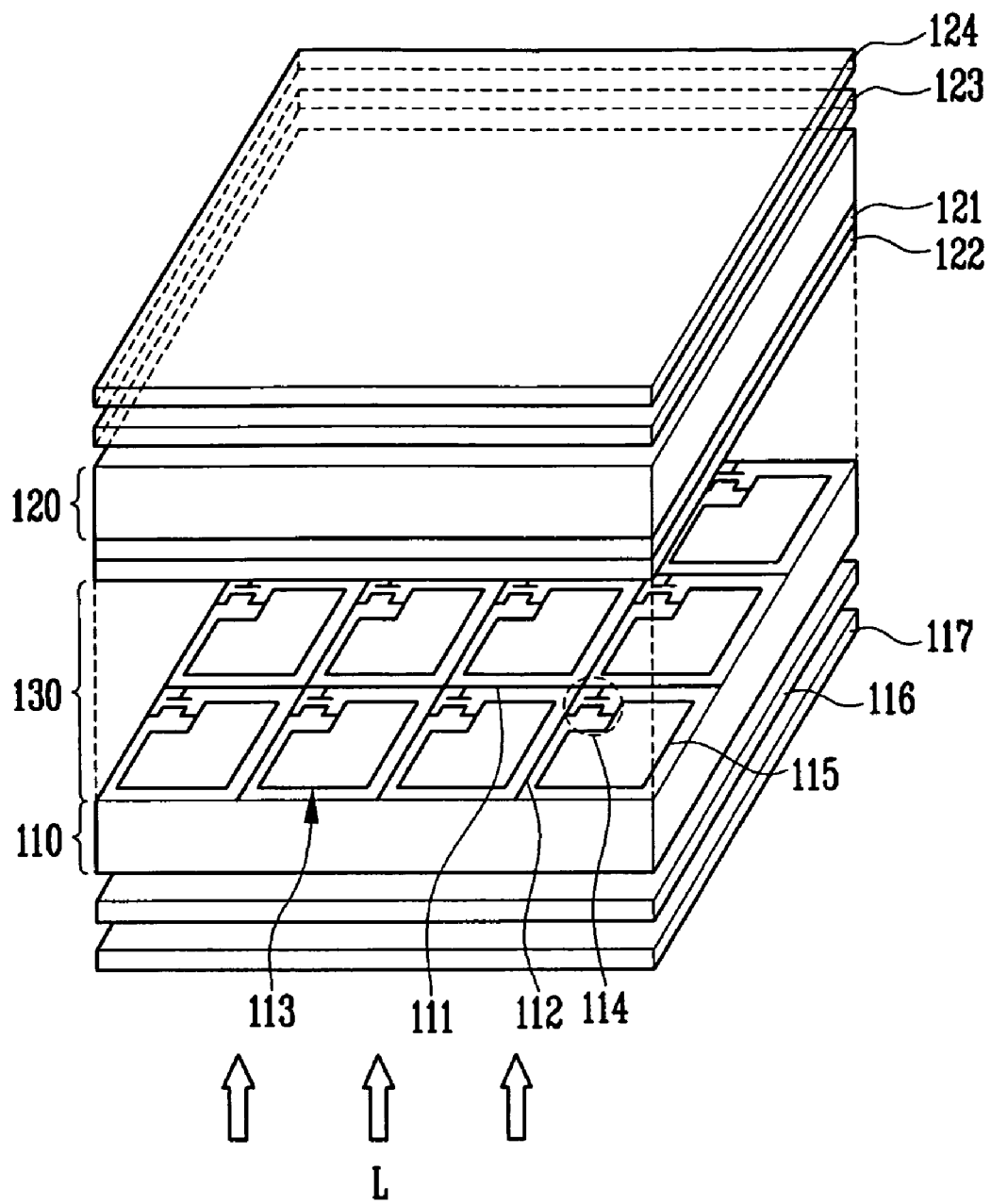
FIG. 2 illustrates an exploded detailed perspective view of the LCD device in FIG. 1.
Figure 3:
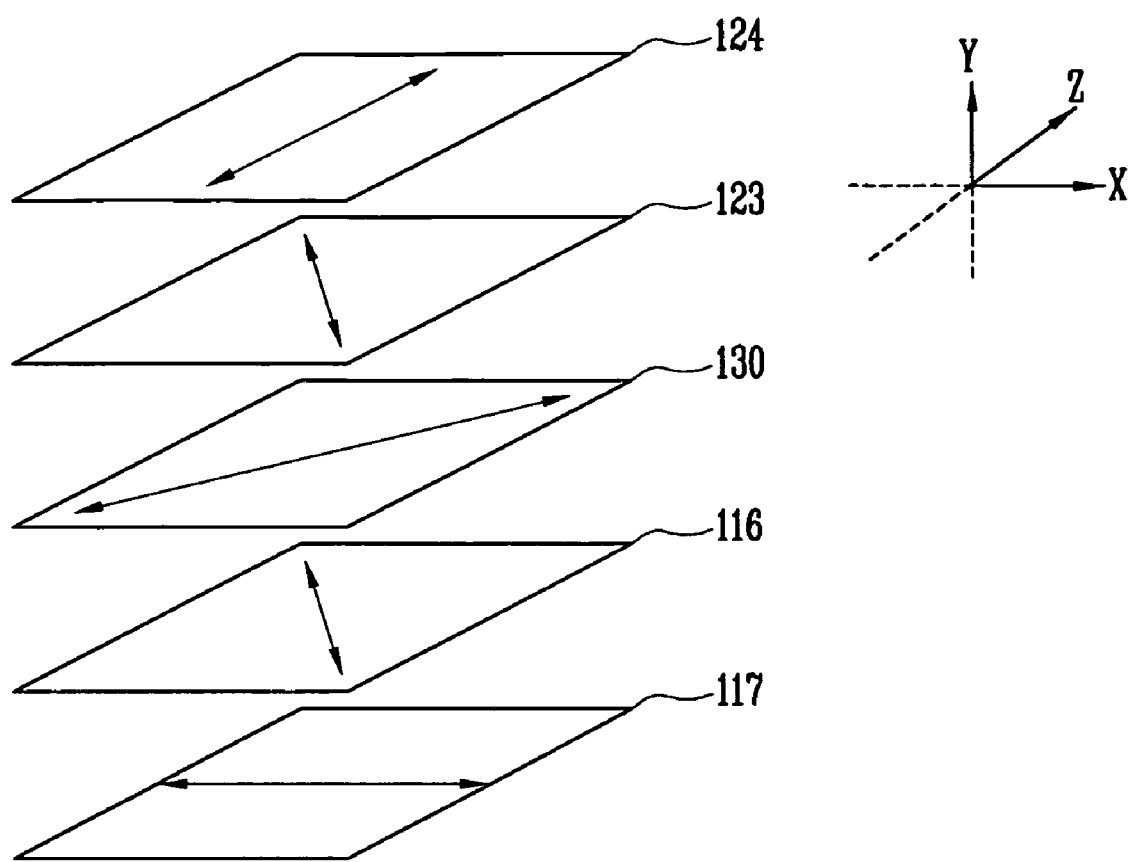
FIG. 3 illustrates a diagram of optical alignments of components of the LCD device in FIG. 1 according to an embodiment of the present invention.

An exemplary embodiment of a liquid crystal display (LCD) device according to the present invention will be described in more detail below with references to FIGS. 1-3. As illustrated in FIGS. 1-2, the LCD may include a lower substrate 110, an upper substrate 120, a liquid crystal layer 130 between the lower and upper substrates 110 and 120, first and second compensation films 116 and 123, and first and second polarizers 117 and 124. The lower and upper substrates 110 and 120 may be between the first and second polarizers 117 and 124. More particularly, as illustrated in FIG. 1, the first compensation film 116 may be between the lower substrate 110 and the first polarizer 117, and the second compensation film 123 may be between the upper substrate 120 and the second polarizer 124. For example, the LCD may be assembled so that the first polarizer 117, the first compensation film 116, the lower substrate 110, the liquid crystal layer 130, the upper substrate 120, the second compensation film 123, and the second polarizer 124 are stacked sequentially, as further illustrated in FIG. 1.

As illustrated in FIG. 2, the LCD may further include a plurality of gate and data lines 111 and 112 in a matrix pattern on a surface of the lower substrate 110. For example, the gate and data lines 111 and 112 may be between the lower and upper substrates 110 and 120, and the gate and data lines 111 and 112 may intersect one another, e.g., perpendicularly, to define a pixel region 113, as further illustrated in FIG. 2. A pixel electrode 115 and a thin film transistor (TFT) 114 may be formed in the pixel region 113, so that the TFT 114 is at an intersection point of the gate and data lines 111 and 112. The TFT 114 may connect the pixel electrode 115 to the gate and data lines 111 and 112. A color filter 121 and a common electrode 122 may be formed between the upper substrate 120 and the second compensation film 123, as further illustrated in FIG. 2.

The LCD may further include a back light unit (not shown) under the lower substrate 110 to provide a driver integrated circuit (IC) and a light source. The driver IC may include a printed circuit board (PCB) and a driving circuit. The PCB may generate scan and data signals, and the driving circuit may supply the generated scan and data signals to corresponding gate and data lines 111 and 112 in accordance with a signal received from an external source via a flexible printed circuit (FPC) electrically connected to a pad unit. The light source may emit light L toward the liquid crystal layer 130, as illustrated in FIG. 2.

The liquid crystal layer 130 of the LCD may be configured to exhibit electrically controlled birefringence (ECB), so that the light L incident on the liquid crystal layer 130 may be reflected therefrom in a form of two rays of light having different refractive indices, i.e., having a predetermined optical retardation. The liquid crystal layer 130 may have a predetermined alignment direction, and may be optically configured with respect to the first and second polarizers 117 and 124, and with respect to the first and second compensation films 116 and 123, in order to improve control of light transmittance therethrough via control of the predetermined optical retardation, thereby improving contrast ratio of an ECB LCD operating at a normally black mode, as will be discussed in more detail below with respect to FIG. 3.

Each of the first and second compensation films 116 and 123 of the LCD may exhibit birefringence. For example, each of the first and second compensation films 116 and 123 may be a quarter-wave plate to exhibit birefringence of ¼ phase, i.e., optical retardation of about 90°. Accordingly, each of the first and second compensation films 116 and 123 may have a birefringence that substantially equals about 1 of a birefringence of the liquid crystal layer 130, so that a sum of optical retardation values of the first and second compensation films 116 and 123 may substantially equal the predetermined optical retardation of the liquid crystal layer 130. It should be noted, however, that the birefringence values of the first and second compensation films 116 and 123 may not be equal, as long as the sum of optical retardation values thereof substantially equals the predetermined optical retardation of the liquid crystal layer 130. Further, an optical transmission axis of each of the first and second compensation films 116 and 123 may be set at an angle of about 90° with respect to the predetermined alignment direction of the liquid crystal layer 130, as illustrated in FIG. 3.

Each of the first and second polarizers 117 and 124 of the LCD may be any suitable polarizer employed in a LCD by one of ordinary skill in the art. The first and second polarizers 117 and 124 may be configured to have perpendicular light absorption axis to each other. Maximum light transmittance in each of the first and second polarizers 117 and 124 may be at 90° with respect to a respective absorption axis. For example, if the first polarizer 117 has a light absorption axis at about 0°, its maximum light transmittance may be at about 90°.

Accordingly, for example, if the liquid crystal layer 130 is configured an alignment direction of about 45°, each of the first and second compensation films 116 and 123 may be configured to have an optical transmission axis of about 135°, and the first and second polarizers 117 and 124 may be configured to have light absorption axes of about 0° and about 90°, respectively. Alternatively, the first and second polarizers 117 and 124 may be configured to have light absorption axes at about 90° and about 0°, respectively. In this respect, it should be noted that the plane of alignment is the xz-plane, as illustrated in FIG. 3, and angles are expressed with respect to the positive x-axis.

Accordingly, when light is incident on the first polarizer 117, rays of light directed along the light absorption axis, e.g., about 0°, may be absorbed therein, while rays of light in other directions may be transmitted through the first polarizer 117 toward the first compensation film 116. The light transmitted toward the first compensation film 116 may be inserted therefrom with a phase delay of about $(+\lambda/4)$ to be incident on the liquid crystal layer 130. The light may be inserted in the liquid crystal layer 130, so that the light may be passed in the liquid crystal layer 130 with a phase delay of about $\lambda/2$, therefore the passed to liquid crystal layer 130 light may be a phase delay of about $(-\lambda/4)$. The light with a phase delay of about $(-\lambda/4)$ may be passed thorough the second compensation film 123. The compensation film have a phase delay of about $(+\lambda/4)$. Therefore, the passed to the second compensation film light may be a phase delay of about 0. In other words, due to the configuration of the optical transmission axis of the first compensation film 116 with respect to the liquid crystal alignment direction of the liquid crystal layer 130, i.e., 90°, the light is incident on the second compensation film 123 at a total phase delay of about zero.

Next, the light incident on the second compensation film 123 may be inserted therefrom at an additional phase delay of about $\lambda/4$, so that the light passed through from the second compensation film 123 toward the second polarizer 124 may be at a substantially same phase as a phase delay of about zero. In other words, the optical retardation caused by the liquid crystal layer 130 may be substantially eliminated. Finally, the light inserted from the second compensation film 123 may be incident on the second polarizer 124 to be completely absorbed therein, thereby providing a normally black mode, i.e., dark state when voltage is not applied to the LCD device.

The LCD device according to embodiments of the present invention may be advantageous in configuring the liquid crystal layer 130 at an optical alignment with respect to the first and second compensation films 116 and 123, so that the initial optical retardation of the liquid crystal layer 130 may be substantially removed, thereby facilitating operation of the ECB LCD at a normally black mode.

Figure 4:
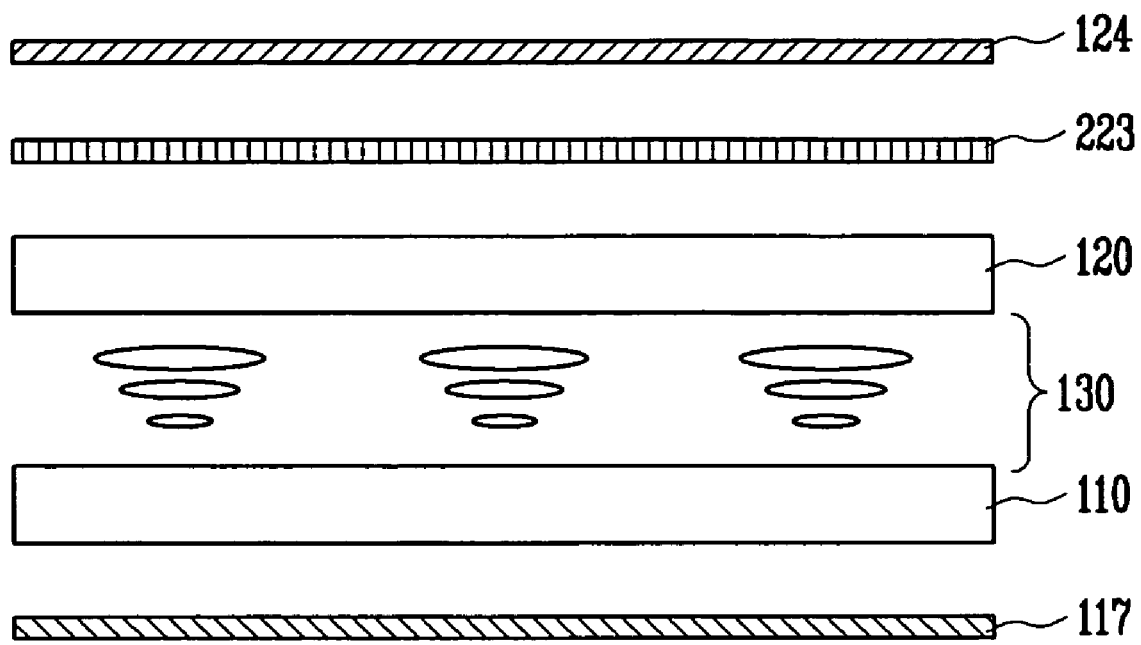
FIG. 4 illustrates a schematic cross-sectional view of a LCD device according to another embodiment of the present invention.

According to another embodiment of the present invention illustrated in FIG. 4, a LCD device may be substantially similar to the LCD described previously with respect to FIGS. 1-3, with the exception of including a single compensation film 223 instead of first and second compensation films 116 and 123. In other words, the liquid crystal layer 130 may be positioned directly above the first polarizer 117, and the single compensation film 223 and the second polarizer 124 may be formed sequentially above the liquid crystal layer 130. In this respect, it is noted that the term "single" with respect to the single compensation film 223 is used solely to distinguish the single compensation film 223 from the first and second compensation films 116 and 123, and therefore, does not indicate any structural characteristics thereof.

Figure 5:
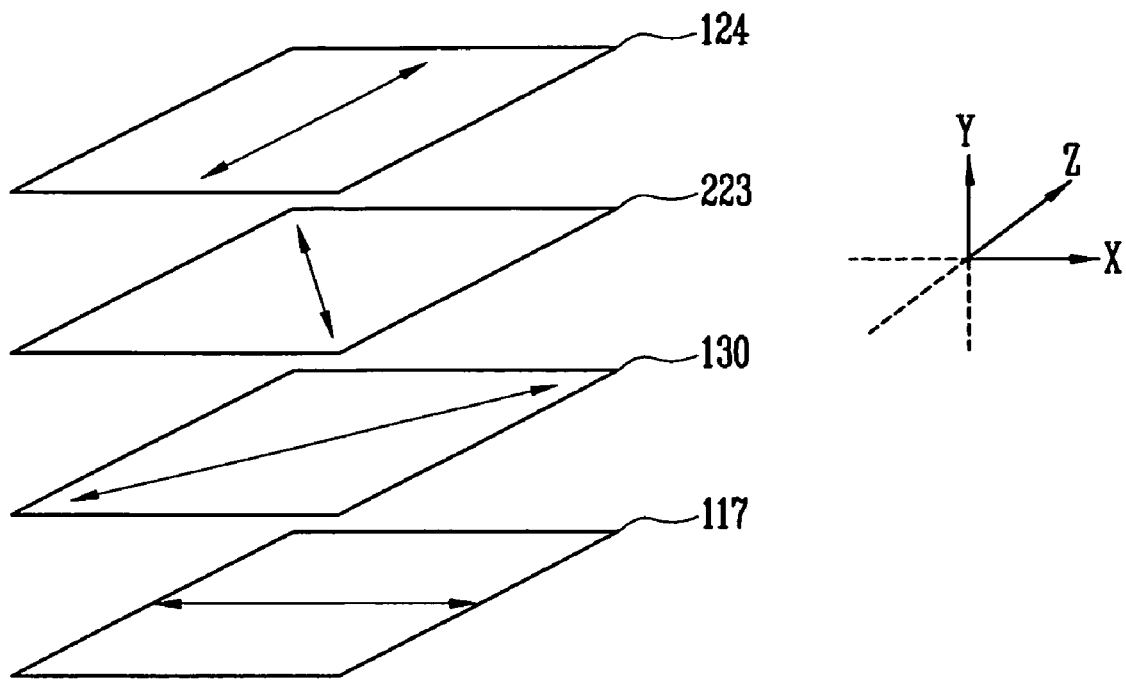
FIG. 5 illustrates a diagram of optical alignments of components of the LCD device in FIG. 4 according to an embodiment of the present invention.

The single compensation film 223 may be, e.g., a half-wave plate, and may have an optical transmission axis at 90° with respect to the predetermined alignment direction of the liquid crystal layer 130, as illustrated in FIG. 5. A retardation of the compensation film 223 may be identical to the retardation of the liquid crystal layer 130, i.e., the compensation film 223 and the liquid crystal layer 130 may have the same birefringence ($\Delta n$). But the direction of retardation is opposed in the compensation film and liquid crystal layer. The compensation film: positive half wave, the liquid crystal layer: negative half wave.

Accordingly, when light is incident on the first polarizer 117, rays of light may be inserted therefrom toward the liquid crystal layer 130. The light may be inserted in the liquid crystal layer 130, so that the light may be passed through from the liquid crystal layer 130 with a phase delay of about $\lambda/2$ toward the single compensation film 223. However, since the single compensation film 223 is a half-wave plate with an optical transmission axis at a 90° angle with respect to the liquid crystal alignment direction of the liquid crystal layer 130. The single compensation film have a phase delay of $(+\lambda/2)$, the liquid crystal layer have a phase delay of $(-\lambda/2)$. Therefore the light passed through the liquid crystal layer 130 and single compensation film 223 may be a phase delay of zero. In other words, the light inserted from the compensation film 223 toward the second polarizer 124 may have a phase delay of 0° with respect to the light transmitted through the first polarizer 117, i.e., an initial retardation of the liquid crystal layer 130 may be removed by the single compensation film 223. Since the first and second polarizers 117 and 124 have perpendicular absorption axes, the light incident on the second polarizer 124 may be completely absorbed by the second polarizer, so that the ECB LCD may operate at a normally black mode.

The operation principle of the ECB LCD may be illustrated with respect to the Jones Matrix method represented by Equations 1-4 below, wherein i denotes an imaginary unit and $\lambda$ denotes a wavelength.

$$\frac{\lambda}{4} \varepsilon^{\frac{i\pi}{4}} \begin{pmatrix} 1 & 0 \\ 0 & -1 \end{pmatrix} \qquad \text{Equation 1}$$

$$\frac{\lambda}{4} \varepsilon^{\frac{-i\pi}{4}} \begin{pmatrix} 1 & 0 \\ 0 & i \end{pmatrix} \qquad \text{Equation 2}$$

$$\frac{\lambda}{2} \varepsilon^{\frac{i\pi}{2}} \begin{pmatrix} 1 & 0 \\ 0 & 1 \end{pmatrix} \qquad \text{Equation 3}$$

$$\frac{\lambda}{2} \varepsilon^{\frac{-i\pi}{2}} \begin{pmatrix} 1 & 0 \\ 0 & 1 \end{pmatrix} \qquad \text{Equation 4}$$

For example, when light is sequentially incident on the first compensation film 116, liquid crystal layer 130, and second compensation film 123, the phase delay in each layer may be offset according to the law of Jones Matrix. More specifically, when the exponential function of Equations 1-4 equals 1, application of Equations 2, 3 and 2 to the first compensation film 116, the liquid crystal layer 130, and the second compensation film 123, respectively, may provide respective phase delays of $\lambda/4$, $(-\lambda/2)$ and $\lambda/4$. When the exponential function of Equations 1-4 equals 1, application of Equations 3 and 4 to the liquid crystal layer 130 and the single compensation film 223, respectively, may provide respective phase delays of $\lambda/2$ and $(-\lambda/2)$.

EXAMPLES

A LCD device according to an embodiment of the present invention, i.e., ECB LCD operating at a normally black mode, was compared to conventional LCD devices, i.e., advanced super view (ASV) LCD and multi-domain vertical alignment (MVA) LCD, in terms of contrast ratio with respect to wide viewing angles. Results are reported in Table 1 below.

TABLE 1

| | NB ECB | ASV (sharp) Transreflective LCD | MVA (TMD) Transreflective LCD |
|---|---|---|---|
| Contrast Ratio | 340:1 | 300:1 | 348:1 |

As described above, embodiments of the present invention provide a normally black (NB) ECB mode LCD device having a compensation film between a liquid crystal layer and a polarizer, so that an optical transmission axis of the compensation film is perpendicular to an alignment direction of the liquid crystal layer. Such a configuration of an ECB LCD device may minimize initial retardation of the liquid crystal layer, thereby increasing a contrast ratio of the NB ECB LCD. Further, the ECB LCD device may have a simple structure, thereby decreasing manufacturing steps and costs in order to enhance its productivity and reduce a unit price thereof.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A liquid crystal display (LCD) device, comprising:
   first and second substrates;
   an electrically controlled birefringence (ECB) mode liquid crystal layer between the first and second substrates;
   a first polarizer under the first substrate;
   a second polarizer on the second substrate; and
   a first compensation film between the first and second polarizers;
   wherein an optical transmission axis of the first compensation film is set at a 90° angle with respect to an alignment direction of the ECB liquid crystal layer.

2. The LCD device as claimed in claim 1, wherein the first and second polarizers are configured to have perpendicular light absorption axes.

3. The LCD device as claimed in claim 1, wherein the ECB mode liquid crystal layer has an alignment direction of about 45°.

4. The LCD device as claimed in claim 1, wherein a retardation of the first compensation film substantially equals a retardation of the ECB liquid crystal layer.

5. The LCD device as claimed in claim 4, wherein the retardation of the first compensation film is about $\lambda/2$.

6. The LCD device as claimed in claim 4, wherein the first compensation film is between the ECB liquid crystal layer and the second polarizer.

7. The LCD device as claimed in claim 1, wherein the first compensation film includes a half wave plate.

8. The LCD as claimed in claim 1, further comprising a second compensation film between the first and second polarizers, the second compensation film having an optical transmission axis set at a 90° angle with respect to the alignment direction of the ECB liquid crystal layer.

9. The LCD device as claimed in claim 8, wherein the ECB liquid crystal layer is between the first and second compensation films.

10. The LCD device as claimed in claim 9, wherein the first compensation film is between the ECB liquid crystal layer and the first polarizer.

11. The LCD device as claimed in claim 10, wherein the second compensation film is between the ECB liquid crystal layer and the second polarizer.

12. The LCD device as claimed in claim 8, wherein the first and second compensation films have substantially same optical retardation values.

13. The LCD device as claimed in claim 12, wherein each of the first and second compensation films includes a quarter wave plate.

14. The LCD device as claimed in claim 12, wherein a sum of optical retardation values of the first and second compensation films substantially equals an optical retardation value of the liquid crystal layer.

15. The LCD device as claimed in claim 1, the LCD device is configured to operate in a normally black mode.

* * * * *